June 18, 1935.  J. D. McLEOD  2,005,099
GLASS RACK
Filed July 7, 1933  2 Sheets-Sheet 1

INVENTOR
JOHN D. McLEOD.
BY Bradley & Bee
ATTORNEY

June 18, 1935.  J. D. McLEOD  2,005,099
GLASS RACK
Filed July 7, 1933  2 Sheets-Sheet 2

INVENTOR
JOHN D. McLEOD.
BY Bradley & Bee
ATTORNEYS.

Patented June 18, 1935

2,005,099

UNITED STATES PATENT OFFICE 2,005,099

GLASS RACK

John D. McLeod, Oakmont, Pa., assignor to Pittsburgh Plate Glass Company, a corporation of Pennsylvania Application July 7, 1933, Serial No. 679,374

4 Claims. (Cl. 49—14)

My invention relates to a mechanism for retaining sheets of glass upon a rack of conventional design.

The primary object of my invention is to provide a device for retaining glass upon a rack which shall be positive in its operation in order that any chance of the glass becoming broken during its transportation in a factory will be obviated. The device of my invention is not only positive in operation, but of rugged and simple construction which insures long life and inexpensive installation.

Figure 1:
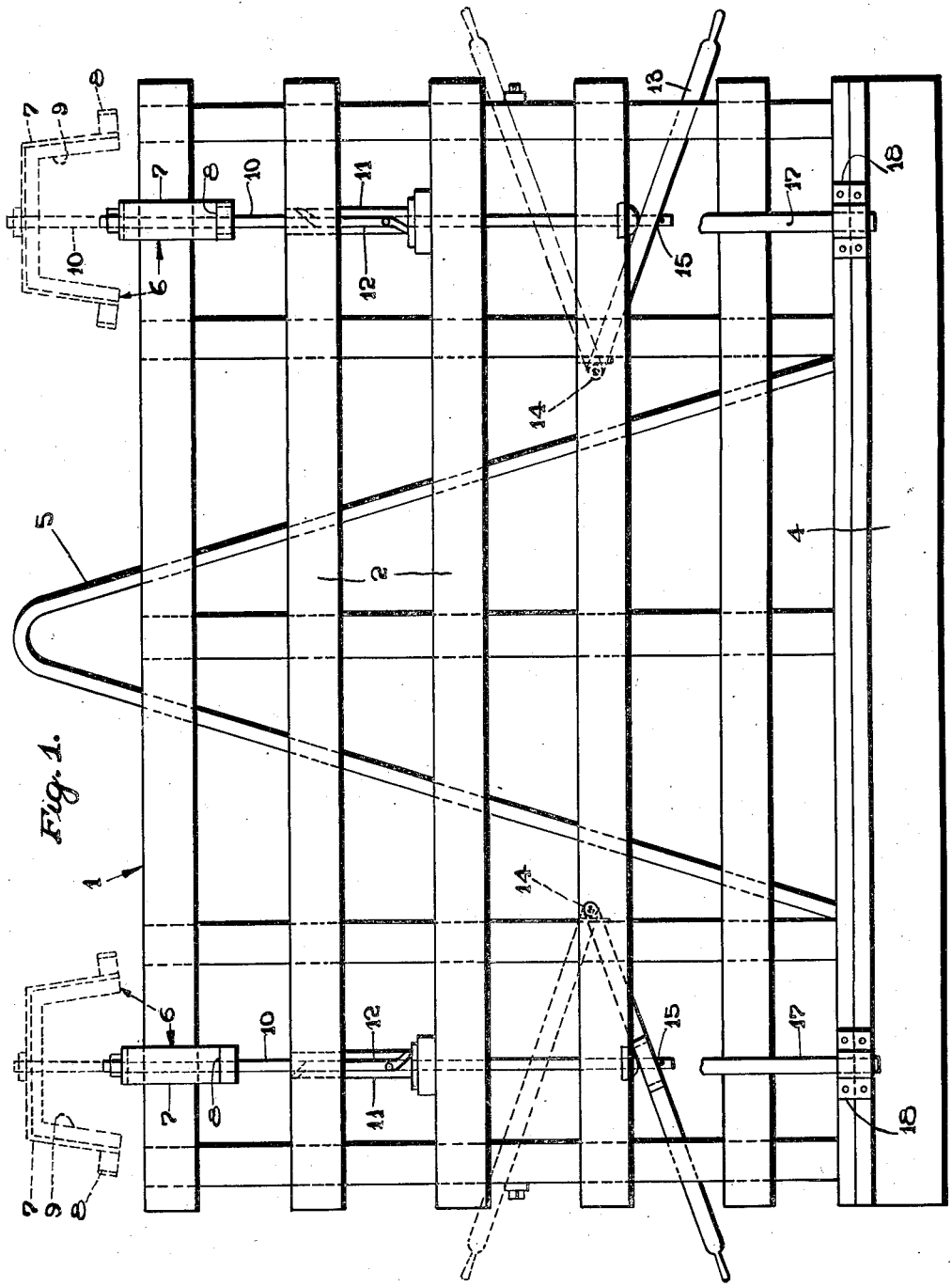
Figure 2:
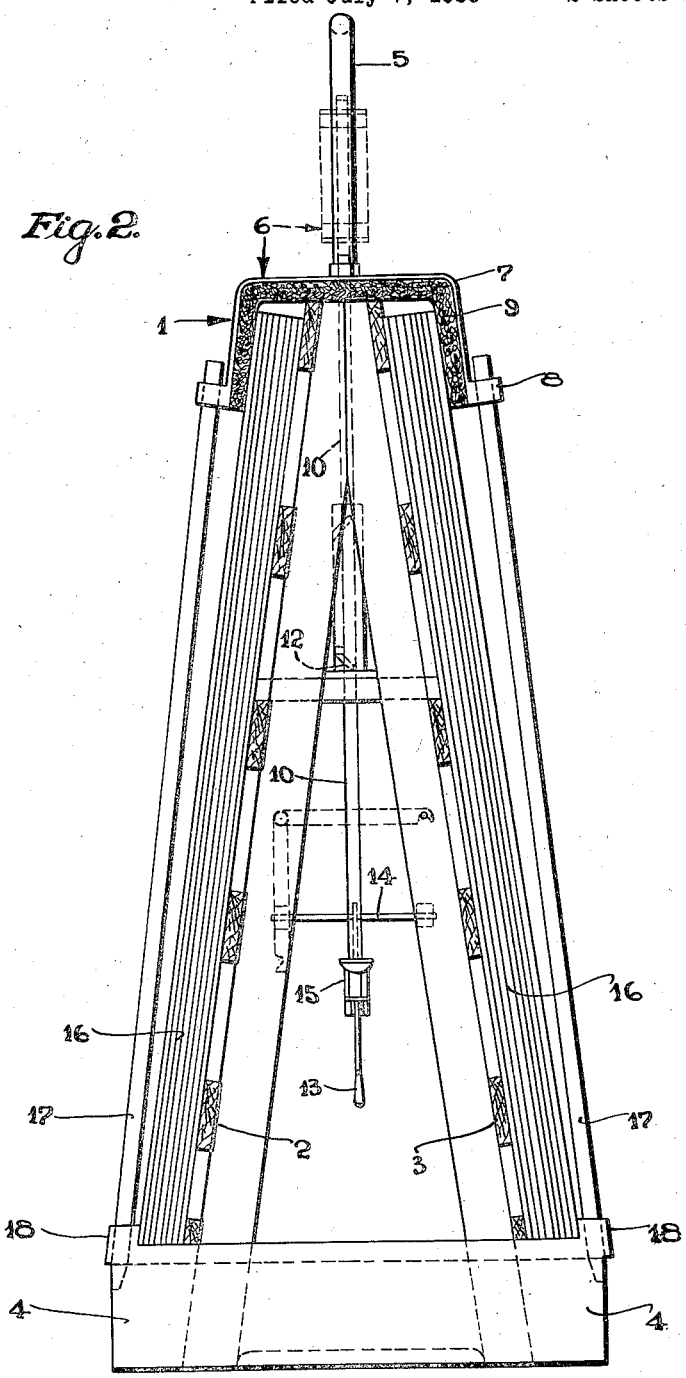

In the drawings, Figure 1 is a side elevational view of a glass rack having a retaining mechanism mounted thereon which is constructed in accordance with my invention; and Fig. 2 is an end view of the assembly shown in Fig. 1.

As shown in the drawings, my device is mounted upon a conventional type of glass rack 1 formed of a plurality of converging frames 2 and 3 secured upon a base 4. The rack is provided with a carrying loop 5. A clamping device 6 is formed by utilizing a member 7 of U-shape which has projecting ears 8 provided with openings, the member 7 being interiorly covered with a yieldable material 9, such as felt. The member 7 is firmly secured to a rod 10 that is mounted in a guide member 11 attached to the framework of the rack 1. The guide member 11 is provided with a cam slot 12 in which a pin is deposed that is secured to the rod 10. A lever 13 is pivotally mounted upon the rack, as indicated at 14 and disposed in a slotted member 15 and in engagement with the lower end of the rod 10.

Although the clamping device 6 positively engages sheets of glass 16 disposed upon the rack, nevertheless additional retaining means may be employed, if desired, by disposing rods 17 through the ears 8 of the member 7 and in retaining members 18 secured near the bottom of the rack. The rods are particularly useful when relatively small sheets of glass are disposed upon the rack. If the dimensions of the glass are such that the members do not engage it, the rods serve to retain it in position. It is not necessary to utilize the rods 17 in conjunction with the retaining member 6 when large sheets of glass are handled, but such members provide an additional factor of safety. A device such as described is mounted at each end of a glass rack in order to provide very positive retaining means for glass sheets disposed thereon. The operation of the device will be manifest from the foregoing description.

In order to move the member 7 to inoperative position, it is only necessary to raise the lever 13 causing the pin upon the rod 10 to move in the cam slot 12 and effect a partial rotation of the member 7 simultaneously with its upward movement. In consequence of simply raising the lever 13, the member 7 is raised above the rack and at the same time turned to a parallel position therewith. In such position, the glass sheets 16 may be either disposed upon or removed from the rack without any obstructing mechanism interfering with the operation.

Although the device of my invention is simple in construction, it is obvious that modifications may be made therein to embody the principles of the invention without departing from the spirit or scope thereof and I desire, therefore, that no limitations shall be imposed except such as indicated in the appended claims.

What I claim is:

1. The combination with a glass rack, of a member of U-shape adapted to engage glass upon both sides of the rack simultaneously and a cam mechanism to support the member whereby it may be raised and rotated to an inoperative position in one operation.

2. The combination with a glass rack, of a member of U-shape adapted to engage glass upon both sides of the rack simultaneously, a rod secured to the member, a guide for the rod embodying a cam slot, a pin secured to the rod and disposed with its free end in the cam slot and means for locking the rod in raised position.

3. The combination with a glass rack, of a member operatively mounted upon the rack and adapted to engage glass upon both sides of the rack simultaneously and an additional retaining member removably attached to the first member.

4. In combination with a movable glass rack having a supporting ledge adjacent its base for the edges of the glass sheets carried by the rack, and an inclined face extending upwardly from the ledge for supporting the faces of the glass sheets, of means for holding the sheets in position on the rack comprising an upright rod mounted for endwise and rotary movement on the rack behind the sheets and having at its upper end a retaining bar extending laterally and downwardly therefrom and adapted, when said rod is lowered, to be in front of the sheets.

JOHN D. McLEOD.